Sept. 7, 1937.  W. R. URQUHART  2,092,720
MEANS FOR MASTICATING PLASTICS OR THE LIKE
Filed Jan. 30, 1935   3 Sheets-Sheet 1

Inventor
William R. Urquhart
By
Attorney

Sept. 7, 1937.  W. R. URQUHART  2,092,720
MEANS FOR MASTICATING PLASTICS OR THE LIKE
Filed Jan. 30, 1935  3 Sheets-Sheet 2
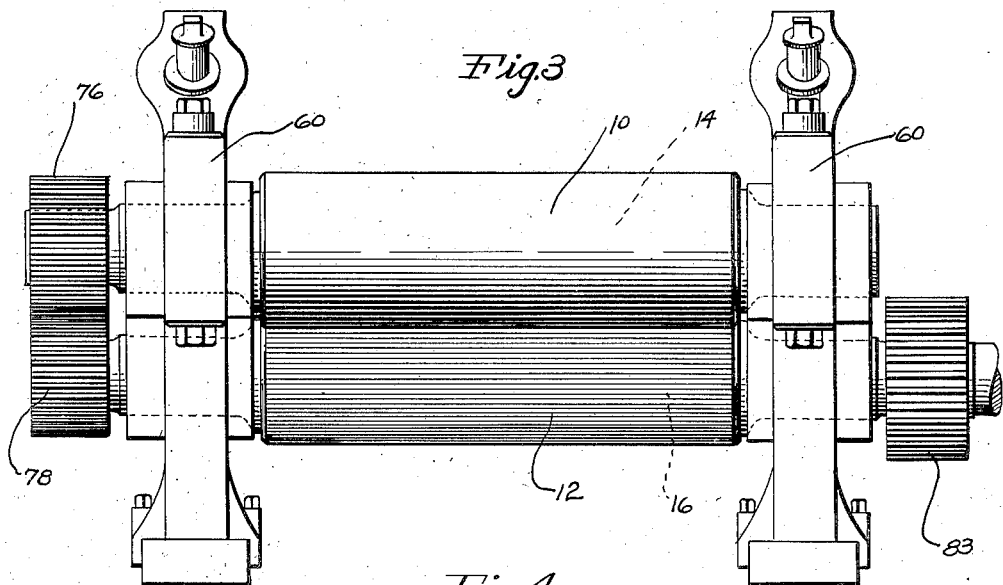
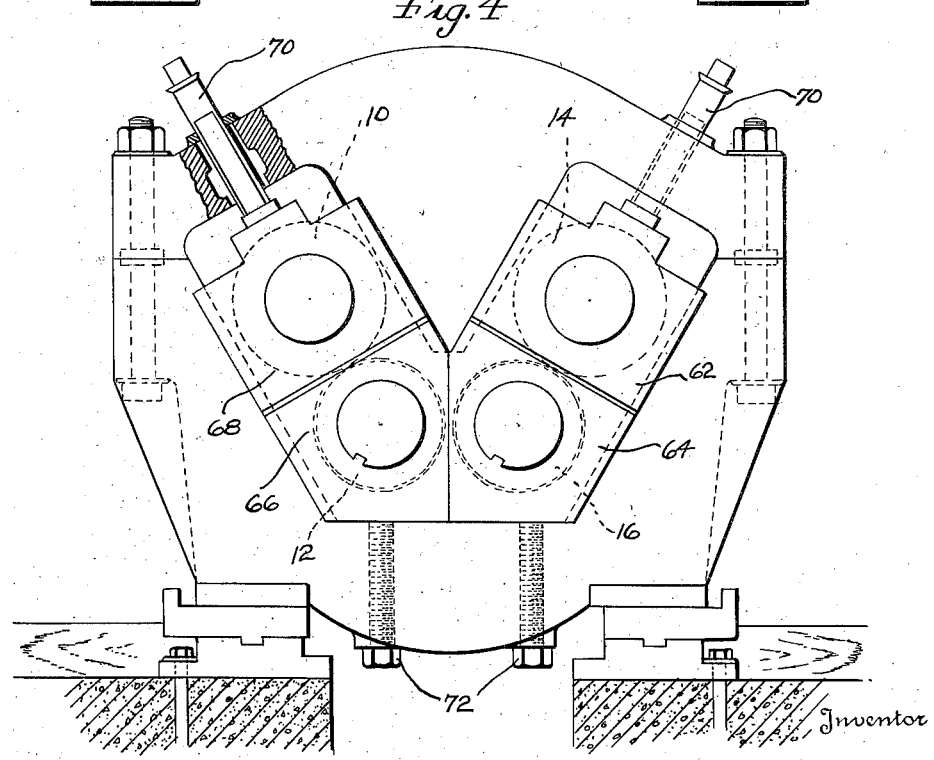
Inventor
William R. Urquhart
By
Attorney

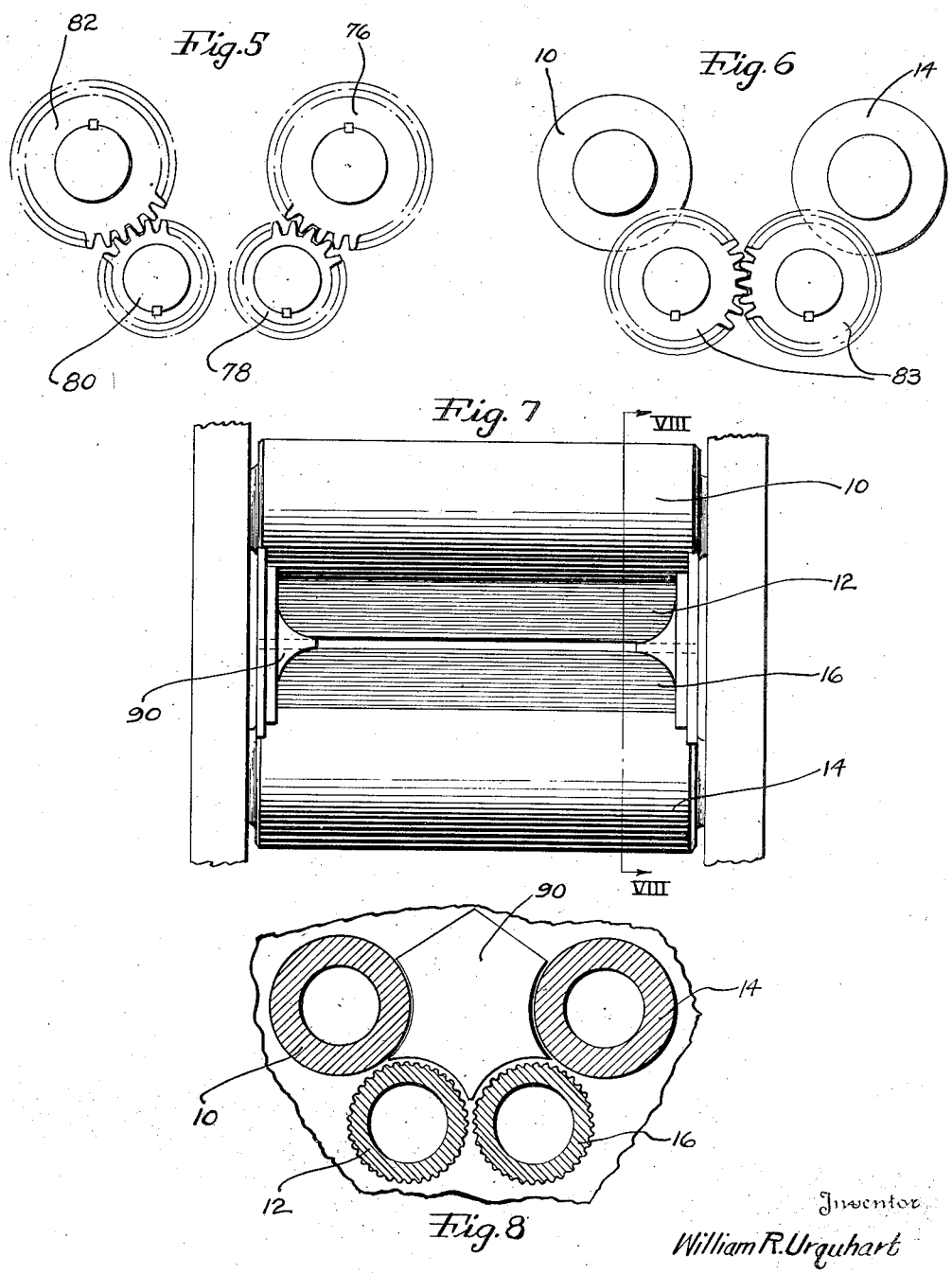

Patented Sept. 7, 1937

2,092,720

UNITED STATES PATENT OFFICE 2,092,720

MEANS FOR MASTICATING PLASTICS OR THE LIKE

William R. Urquhart, Akron, Ohio, assignor to Wingfoot Corporation, Wilmington, Del., a corporation of Delaware Application January 30, 1935, Serial No. 4,098

16 Claims. (Cl. 18—2)

This invention relates to improved processes and mechanism for masticating plastics such as rubber and is more particularly concerned with apparatus whereby plasticizing operations are performed automatically and in shorter time intervals than has heretofore been known.

It is an object of the present invention to improve mixing mills or plastics and provide an improved mixing mill which will avoid some of the difficulties experienced with prior-known mixing mills for plasticating compounds such as rubber.

Another object of the present invention is to provide a plasticizing mill in which the operation is almost entirely automatic once the materials have been deposited therein.

Another object of the invention is to provide a novel method and mechanism for masticating plastics such as rubber, in which the time required is materially reduced over former-known methods and apparatus and the amount of material handled is considerably greater than that before produced in the same time interval.

Another object of the invention is the provision of means which are primarily and particularly adapted to effect a preliminary softening or a plasticizing of mixed materials. This operation is ordinarily performed on so-called non-productive batches of plastic which in the rubber industry include crude rubber with or without the addition of pine tar, reclaim or other mixed-in compound. Broadly, a plasticizing operation contemplates the absence of all free, unmixed powdered pigments, accelerators, vulcanizers and the like. While the general or particular object of the invention is to provide improved plasticizing apparatus, the invention also contemplates embodiments which are adapted to perform substantially any plastic masticating operation inclusive of plasticizing as well as mixing materials. These embodiments of the apparatus can be used for a final or a complete milling and mixing operation. Furthermore, the last-named apparatus is adapted to handle combinations of the above plasticizing and milling operations either in turn or as one complete operation.

The foregoing and other objects of the invention are achieved by the methods hereinafter described and by the apparatus illustrated in the accompanying drawings, wherein:

Fig. 3 is a side elevation of one embodiment of plasticizing apparatus which is constructed according to the principles of the invention;

Fig. 4 is an end elevation of the apparatus seen in Fig. 3;

Fig. 5 is a diagrammatic illustration of the drive between the lower and upper rolls in the mechanism shown in Figs. 3 and 4;

Fig. 6 is a diagrammatic view showing the drive between the bottom rolls in the apparatus seen in Figs. 3 and 4;

Fig. 7 is a partial plan view of the apparatus seen in Figs. 3 and 4; and

Fig. 8 is a sectional view taken on line VIII—VIII of Fig. 7.

Figure 1:
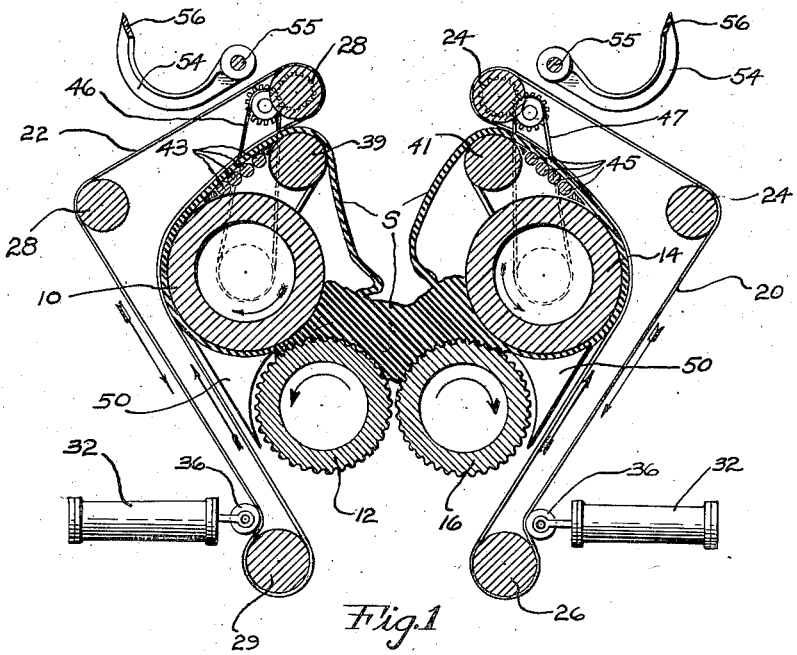
Fig. 1 is a diagrammatic cross-sectional view illustrating one form of plasticizing apparatus for achieving the objects of the invention. This view shows the mechanism in the masticating cycle.
Figure 2:
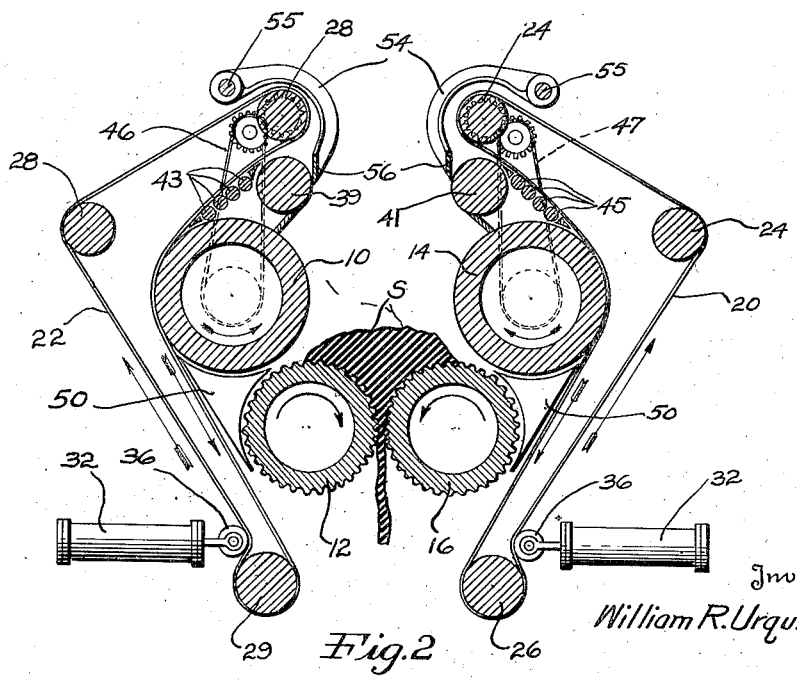
Fig. 2 is a view similar to Fig. 1 illustrating the apparatus thereof in the discharging cycle.

An understanding of the invention can best be had by reference to Figs. 1 and 2 which illustrate respectively the masticating cycle and the unloading cycle of one embodiment of a plasticizer constructed according to the inventive principles.

In Fig. 1 the numerals 10 and 12 indicate a pair of rolls which are journaled with their axes in a plane which lies at an angle of from approximately 45 to 135° of the plane of the axes of journaled rolls 14 and 16. It will be seen that the rolls 10 and 12 cooperate to have a bight as do rolls 14 and 16. Likewise, rolls 12 and 16 cooperate to form a discharge bight under certain conditions of operation as hereinafter explained. Preferably the rolls 12 and 16 are provided with corrugated surfaces as shown and rolls 10 and 14 may, if desired, be likewise so designed, although other known types of surfaces may likewise be employed. The advantage of corrugated rolls for providing a greater heat-dissipating surface and a better tearing surface are well known.

Any usual cooling means may be associated with the rolls as by passing water through the rolls. The invention also contemplates using refrigerated water in the rolls or cool air circulated through the rolls or through the hopper itself. In the latter case the entire apparatus will necessarily be provided with a cover or casing of sheet metal or the like.

The various rolls are driven by any suitable means such as hereinafter explained, so that the surface speed of rolls 12 and 16 is different from that of rolls 10 and 14, which are of the same speed, whereby the usual tearing and mixing action of the rolls is obtained. The rolls are, during the mixing cycle, driven in the direction shown by the arrows. While the preferred operation under the invention is as just described yet a particular concept of the invention is to provide gearing which operates the rolls 10 and 14 at different relative speeds so that the feed toward and from the hopper will be varied by the various rolls, resulting in a better masticating action. Again, the drive to the rolls 10 and 14 may be by elliptical gears or the like so that first one rolls and then the other will run faster, which will still further aid in getting the rubber which passes through one bight to go through the other bight periodically or otherwise intermix the plastic.

Associated with the rolls are aprons 20 and 22 which are carried by suitable rollers 24, 26, 28 and 29. Means may be provided to tighten the aprons 20 and 22 when desired, and these means may comprise air cylinders 32 which carry take-up rollers 36 on their piston rods, which contact with the aprons in the manner illustrated, so that if desired the aprons can be driven with the rolls or not. Inasmuch as the invention is particularly adapted for work as a plasticizer the aprons need not extend beneath the rolls 12 and 16 as little or no material will fall therethrough.

Associated with the top of the apparatus are longitudinally extending rolls or bars 39, 41 and rollers 43 and 45 that can be positively driven or not as desired and which function to pick up the sheeted stock carried by the aprons and to carry it sufficiently far over the hopper formed by the rolls 10, 12, 14 and 16 that the stock when it is discharged into the hopper will fall into such a position that it can be drawn in between either rolls 10 and 12 or 14 and 16. As additional means for effecting the desired apron drive, chains or belts 46 and 47 preferably extend from the rolls 10 and 14 to the rollers 24 and 28 supporting the upper ends of the apron. Or again, the drive for aprons 20 and 22 may be between rolls 12 and 29 or rolls 16 and 26 if found more advantageous.

The rubber or other plastic stock which is being plasticized is identified by the letter S and, as will be seen, the rubber is positioned in a hopper formed by the rolls and is caught in two bights between the rolls 10 and 12 and 14 and 16, respectively, and due to the direction of rotation of the aprons 20 and 22 when the stock S is sheeted through the mills, it is carried back up over the rolls 10 and 14 and 39 and 41 and again feeds down to the hopper and to one or the other of the rubber banks, as chance may have it. As shown in Fig. 1 the plastic S does not in the preferred manner of operation lie in two separate banks but fills the whole hopper bottom. To assist in obtaining the desired directional feed for the rubber, wedge bars or blocks 50 may be utilized in the positions indicated. These bars preferably extend the full length of the rolls, but may only be employed near the ends of the rolls if found advantageous.

Associated with the top of the rolls 39 and 41, it may be desirable to mount cutter assemblies which insure complete removal of the stock from the mill in the discharging operation and which prevent reverse movement of the sheeted stock during the discharge operation. These assemblies may include curved arms 54 pivotally mounted at 55 and carrying knives 56 which will serve to cut the rubber or stock sheet passing over the rolls 39 and 41 when the cutters are moved from the masticating position seen in Fig. 1 to the discharging position shown in Fig. 2. The cutters prevent the stock from feeding back over the rolls 39 and 41 when the apparatus is reversed. Any suitable means such as air cylinders (not shown) may be employed for operating the cutter arms 54.

In the plasticizing operation employing the apparatus just described, the plastic in the form of a non-productive batch is dumped into the U-shaped hopper opening formed by the four rolls, with the clearance between rolls 12 and 16 ordinarily somewhat less than the clearance between rolls 10 and 12 and rolls 14 and 16. Thus, for the plasticizing operation where no comminuted particles, powders or the like are mixed, the small clearance between rolls 12 and 16 will cause no difficulty, nor loss of stock. The turning of the rolls will moreover carry the various materials away from the bight of rolls 12 and 16 and up to the spaced bights of rolls 10 and 12 and rolls 14 and 16 and continued movement will cause the stock to flow around over rolls 10 and 14 and rolls 39 and 41, and back to the hopper with a constant effective plasticizing operation being achieved.

A very important feature of the invention is that with the apparatus of the invention it is possible to materially accelerate the surface speed of the rolls from known speeds of approximately 90 feet per minute up to at least 120 feet per minute, and under certain conditions to even higher speeds, such as approximately 150 feet per minute. More specifically roll speeds have heretofore largely been governed by not employing speeds beyond those at which an operator can cut, handle, and remove stock from a mill. Under the present invention the speed limit is set solely by temperature which must be kept below scorching or burning the stock. Thus, the invention contemplates from approximately 30% to approximately 60% greater surface speeds. This will of course materially reduce the plasticizing time involved and results in a material saving in time and cost. As a matter of fact it has been found that from about three to five times as much stock can be handled in approximately the same time interval.

In Fig. 2 is diagrammatically illustrated the apparatus of Fig. 1 when the same is employed in the unloading cycle. It will be noted that the direction of rotation of all the rolls and aprons has been reversed and that now the stock S is extruded through the rolls 12 and 16 in the form of a flat wide ribbon. Any stock which by sticking to the rolls 39 and 41 is carried over the top of the rolls, will be scraped or cut therefrom by the cutters 56 which are designed to come into play upon reversal of the direction of rotation of the rolls. The aprons 20 and 22 in this operation may be loosened by retraction of the take-up rolls 36 carried by the air cylinders 32 if found necessary, however this is not ordinarily contemplated. In this manner the entire mill can be very quickly and positively unloaded by merely reversing the electric motor or other prime mover operating the plasticizer. Suitable conveyors or other means can be employed to carry the stock in ribbon or lump form to the calenders, presses, cutters, or to any destination where it is next employed or treated.

In Figs. 3 to 7 is illustrated one embodiment of a complete machine designed in accordance with the present invention. In these figures the numerals 60 indicate a pair of spaced housings which are secured to the floor in any suitable manner or to each other with longitudinal members, as is found most desirable in the particular installation in which the machine is put. Carried in the housings 60 are bearing blocks 62, 64, 66 and 68 which are preferably made vertically adjustable and which journal the rolls 10, 12, 14 and 16. The bearing blocks 62—68 can be made adjustable in any suitable manner as by the provision of screws 70 and 72. In this manner the clearance between any of the rolls can be adjusted as desired to take care of different types and conditions in masticating the plastics. The rolls 10, 12, 14 and 16 are provided with the usual stud axle extensions which are carried in the bearing blocks 62—68, and at one end of the mill these studs are extended beyond the bearing blocks and receive gears 76, 78, 80 and 82, and at the other end meshing gears 83 are mounted on stud extensions of rolls 12 and 16.

Figure 5 illustrates diagrammatically the relation of the driving gears 76, 78, 80 and 82 and it will be recognized that the relative number of teeth on the gears causes the surface speed of the lower rolls 12 and 16 to be considerably greater than the surface speeds of the upper rolls 10 and 14, thereby effecting the desired tearing and masticating action in the plasticizing operation. One of the gears 83 is connected to the electric motor which drives the mill. Suitable means for reversing the rotation of driving means are old and well known and will not be described herein.

A novel feature of the embodiment shown in Figs. 3 to 7 is that end plates 90 are provided on the housing 60 with finger-like portions which extend into the bights of each mating pair of rolls. Particularly between the bottom rolls 12 and 16 do the extensions of the end plates 90 have an important effect in that they serve to considerably reduce the length of the opening between the rolls and thereby reduce the width of the sheet of stock which is discharged from the machine. While finger-like projections of the end plates likewise extend between rolls 10 and 12 and 14 and 16 at the bights, the extending fingers preferably do not narrow the effective width of these rolls.

It is believed that the operation of the particular embodiment illustrated and described in detail will be evident from the description given above of the operation of the diagrammatic mechanism seen in Figures 1 and 2. Suffice it to say that the mechanism is substantially automatic with materials being dumped into the pocket or trough formed by the four rolls and with substantially no attention being required until the plasticizing is completed. At this time the operator merely reverses the direction of roll rotation and the plastic is discharged from the mill.

It should be appreciated that the principles of the invention can be embodied in various other forms than those herein illustrated and described, and that the mechanism can be adapted to handle substantially any plastic. In the normal operation of the apparatus the rubber or other plastic tumbling over the top of the upper rolls 39 and 41 will quite often fall into an opposite bank, particularly if the trough between the rolls is filled in its bottom with plastic. Also, where the rolls 10 and 14 turn at different speeds or at alternating speeds as described heretofore the tumbling action of the sheeted plastic back into the hopper to effect a better mastication and to prevent the same plastic sheet from again passing through the same bight is largely eliminated. Moreover, if found desirable the rolls 39 and 41 may be positioned still closer together so that the sheeted stock will be fed back substantially to the center of the hopper.

Even though the masticating apparatus herein described is run at considerably greater speed than former-known types of equipment, the entire operation is performed without the operator's attention, so that there is no danger of injury to the operator because of the increased speed. Likewise, it is easy to compensate for the higher temperatures naturally encountered at increased speed by cooling with water circulated through the mill rolls, which is more difficult in the so-called "Banbury" type of mixer. The entire machine, except for the opening at the top and bottom, can be enclosed in a cover if desired, thereby substantially eliminating odors, dust and the likelihood of foreign matter flying into the plastic.

Although in accordance with the patent statutes one diagrammatic embodiment and one complete form of the invention have been illustrated, it will be understood that the invention is in no way limited thereby or thereto, but is actually defined in the appended claims.

What I claim is:

1. Mechanism for plasticizing rubber stock comprising a double pair of rolls, with the planes of the axes of each pair being inclined to each other and with the bottom rolls of each pair close to each other, and with the four rolls thereby forming a hopper, an apron associated with each pair of rolls and adapted to convey any stock passing between each pair of rolls back into the hopper, said bottom rolls being corrugated and driven at a substantially different relative surface speed than the upper rolls, discharge scraper assemblies associated with each top roll, means for turning the rolls so that each pair of rolls conveys stock out of the hopper and into the associated apron and thus back into the hopper, and means for reversing the direction of rotation of the rolls to discharge the contents of the hopper through the two bottom rolls.

2. Mechanism for masticating plastic comprising a double pair of rolls, with the planes of the axes of each pair being inclined to each other and with the bottom rolls of each pair close to each other, and with the four rolls thereby forming a hopper, an apron associated with each pair of rolls and adapted to convey any stock passing between each pair of rolls back into the hopper at a position approximately centrally thereof, said bottom rolls being driven at a substantially different relative surface speed than the upper rolls, and scraper bars associated with each top roll.

3. Mechanism for treating plastic material comprising a double pair of masticating rolls, with the planes of the axes of each pair being inclined to each other and with the bottom rolls of each pair close to each other, and with the four rolls thereby forming a hopper, an apron associated with each pair of rolls and adapted to convey any material passing between each pair of rolls back into the hopper, said bottom rolls being driven at a substantially different relative surface speed than the upper rolls.

4. Mechanism for plasticizing rubber comprising a double pair of rolls, with the plane of the axes of one pair being inclined to the plane of the axes of the other pair of rolls and with the bottom rolls of each pair close to each other and with the four rolls thereby forming a hopper, and means associated with each pair of rolls and adapted to convey any stock passing between each pair of rolls back into the hopper.

5. Mechanism for treating plastic comprising a double pair of masticating rolls with the planes of the axes of each pair being inclined to each other and with the bottom rolls of each pair adjacent each other and with the four rolls, thereby forming a hopper, means associated with each pair of rolls and adapted to convey any plastic passing between each pair of rolls back into the hopper, means for turning the rolls so that each pair of rolls conveys plastic out of the hopper and into the refeeding means, and means for reversing the direction of the rolls to discharge the contents of the mechanism between the bottom rolls of each pair.

6. Mechanism for treating plastic stock comprising a double pair of rolls for treating said plastic stock as it passes through each pair of rolls, with the planes of the axes of each pair being inclined to each other and with the bottom rolls of each pair adjacent to each other, and with the four rolls thereby forming a pocket or trough, and means associated with the bottom rolls of each pair for reducing materially the width of the plastic mass as same is fed between said rolls.

7. Apparatus for plasticizing plastics comprising a plurality of rolls forming a pocket, said rolls continuously drawing a portion of the plastic away from the pocket at a plurality of points and subjecting the plastic as drawn to a plasticizing operation, means for returning the plastic to the pocket and means to effect removal of the plastic from the apparatus on completion of the operation.

8. Apparatus for treating plastics comprising a plurality of rolls forming a hopper, said rolls continuously drawing a portion of the plastic away from the hopper at a plurality of points and subjecting the plastic as drawn to a kneading operation, and means for returning the plastic to the hopper.

9. Apparatus for milling plastics comprising means forming a pocket including means for continuously drawing a portion of the plastic away from the pocket at a plurality of points and subjecting the plastic as drawn to a mixing operation, means for returning the plastic to the pocket and means to effect removal of the plastic from the apparatus on completion of the mix.

10. Mechanism for treating plastic stock comprising a double pair of rolls for treating said plastic stock as it passes through each pair of rolls, the planes of the axes of each pair being inclined to each other and with the bottom rolls of each pair adjacent to each other, the four rolls thereby forming a pocket or trough, and plates associated with and arranged between said bottom rolls, sloping downwardly and inwardly into the space therebetween from the opposite ends thereof and toward each other, for reducing materially the width of the plastic stock as the same moves into the bite of said rolls.

11. Apparatus for treating plastic stock comprising pairs of rolls arranged with the bottom rolls of each pair closely adjacent each other and with each of the upper rolls of each pair close to the lower roll of the pair, but materially spaced from the upper roll of the other pair whereby to form a hopper for plastic material therebetween, means for rotating said rolls in a direction to feed plastic stock out of said hopper between pairs of rolls, means for guiding the stock back into the hopper whereby it becomes associated with the plastic therein, means for cutting the stock being fed back into the hopper and means for reversing at least the bottom rolls of each pair to feed the stock in said hopper out of said hopper through said bottom rolls.

12. Mechanism for plasticizing rubber stock comprising a double pair of rolls, with the planes of the axes of each pair inclined to each other and with the bottom rolls of each pair close to each other, the four rolls thereby forming a hopper, an apron associated with each pair of rolls adapted to convey any stock passing between each pair of rolls back into the hopper, said bottom rolls being corrugated, discharge scraper assemblies associated with each top roll, means for turning the rolls so that each pair of rolls conveys stock out of the hopper and over the associated apron back into the hopper, and means for reversing the direction of rotation of at least the bottom rolls to discharge the contents of the hopper through the bottom rolls.

13. Mechanism for masticating plastic comprising a double pair of rolls, the planes of the axes of each pair being inclined to each other and with the bottom rolls of each pair close to each other, the four rolls thereby forming a hopper, an apron associated with each pair of rolls and adapted to convey any stock passing between each pair of rolls back into the hopper at a position approximately centrally thereof, and scraper bars associated with each top roll for separating the material from said rolls as the same is directed back into said hopper.

14. Mechanism for masticating plastic comprising pairs of rolls with substantially parallel axes arranged with the upper rolls of each pair spaced substantially from each other but close to the lower rolls of the respective pairs, the lower rolls being arranged close to each other, whereby said rolls form a hopper for material to be masticated, means for rotating said pairs of rolls in a direction to feed material out of said hopper and roll it into sheet form between the rolls of each pair, means for stripping the material from the upper rolls to which the material adheres and for directing the stripped material upwardly and inwardly into said hopper free of said upper rolls, whereby it becomes associated with the mass of material in said hopper, and means for subsequently reversing the direction of rotation of said rolls when the material has been masticated to the proper degree, whereby the lower rolls then feed the material out of said hopper in sheet form.

15. A device as set forth in claim 14 in which the means for directing the material back into said hopper comprises guides arranged substantially tangent to said upper rolls and movable elements paralleling said guides for pressing the material stripped from said rolls against said guides and for directing them along said guides back into said hopper.

16. A device as set forth in claim 14 in which the means for directing the material back into said hopper comprises guides arranged substantially tangent to said upper rolls and movable elements paralleling said guides for pressing the material stripped from said rolls against said guides and for directing them along said guides back into said hopper, said movable elements comprising endless belts contacting material moving over said guides and driven in the direction of movement of the material as it leaves the rolls.

WILLIAM R. URQUHART.